(12) United States Patent
Inoue

(10) Patent No.: US 12,374,231 B2
(45) Date of Patent: Jul. 29, 2025

(54) EDUCATIONAL WEB SERVICE PROVIDING METHOD, RECORDING MEDIUM, AND SERVER

(71) Applicant: CASIO COMPUTER CO., LTD., Tokyo (JP)

(72) Inventor: Takayuki Inoue, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 614 days.

(21) Appl. No.: 17/590,356

(22) Filed: Feb. 1, 2022

(65) Prior Publication Data

US 2022/0284825 A1 Sep. 8, 2022

(30) Foreign Application Priority Data

Mar. 5, 2021 (JP) ................................. 2021-035698

(51) Int. Cl.
*G09B 7/02* (2006.01)
*G06F 3/0486* (2013.01)
*G09B 19/02* (2006.01)

(52) U.S. Cl.
CPC ............. *G09B 7/02* (2013.01); *G06F 3/0486* (2013.01); *G09B 19/025* (2013.01)

(58) Field of Classification Search
None
See application file for complete search history.

(56) References Cited

U.S. PATENT DOCUMENTS

| 2015/0269868 A1* | 9/2015 | Carney ................... G09B 7/02 434/188 |
| 2018/0096619 A1* | 4/2018 | Fuka ....................... G09B 7/02 |
| 2019/0385479 A1* | 12/2019 | Carney ................. G06F 3/0488 |

FOREIGN PATENT DOCUMENTS

| JP | 2001-056634 A | 2/2001 |
| JP | 2005-215540 A | 8/2005 |
| JP | 2013-072907 A | 4/2013 |
| JP | 2015-049306 A | 3/2015 |
| JP | 2018195116 A | 12/2018 |
| JP | 2021012341 A | 2/2021 |

OTHER PUBLICATIONS

Notice of Reasons for Refusal dated Dec. 13, 2022 received in Japanese Patent Application No. JP 2021-035698.

* cited by examiner

*Primary Examiner* — Jason T Yen
(74) *Attorney, Agent, or Firm* — SCULLY SCOTT MURPHY & PRESSER, PC

(57) ABSTRACT

An educational web service providing method includes accepting input of an answer to a question and a process until the answer is derived, displaying the answer and the process on a display, and transmitting the answer and the process in association with each other to a server.

9 Claims, 13 Drawing Sheets

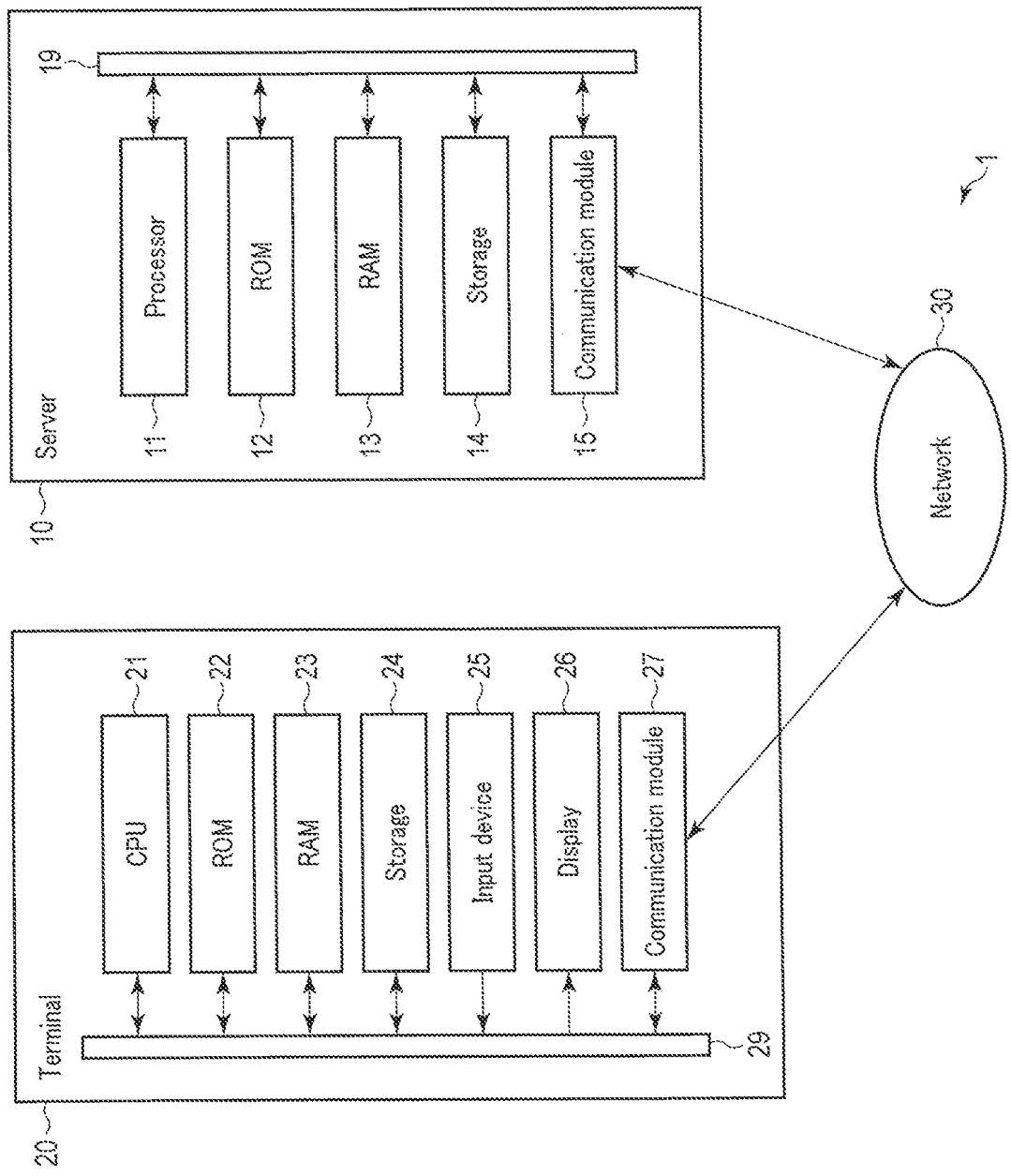
F I G. 1

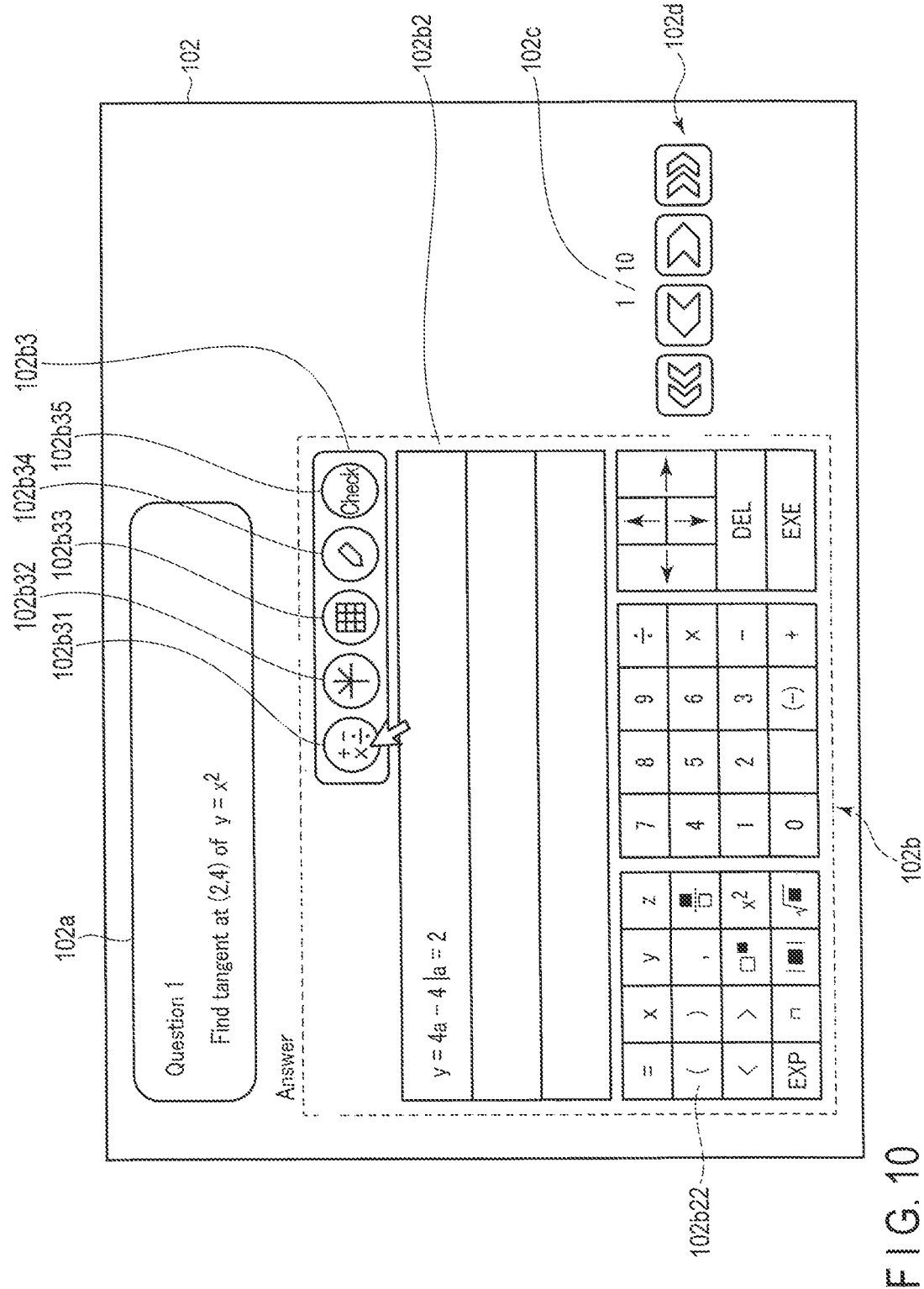
F I G. 10

EDUCATIONAL WEB SERVICE PROVIDING METHOD, RECORDING MEDIUM, AND SERVER

CROSS-REFERENCE TO RELATED APPLICATIONS

This application is based upon and claims the benefit of priority from the Japanese Patent Application No. 2021-035698, filed Mar. 5, 2021, the entire contents of which are incorporated herein by reference.

FIELD

The present invention relates to an educational web service providing method, a recording medium, and a server.

BACKGROUND

In recent years, online classes are being introduced. In such online classes, tests and the like are also executed online. As a tool used by an answerer to solve a question in an online test or the like, application software that operates on a browser is used in some cases, as in Jpn. Pat. Appln. KOKAI Publication No. 2005-215540.

In a math test or the like, not only whether an answerer can correctly answer a question but also a process to reach a correct answer may be important. However, in an online test or the like, normally, only an input answer is transmitted to a server. Hence, depending on a question, the scoring accuracy lowers as compared to a test using paper.

SUMMARY

According to a first aspect, there is provided an educational web service providing method comprising: accepting input of an answer to a question and a process until the answer is derived; displaying the answer and the process on a display; and transmitting the answer and the process in association with each other to a server.

According to a second aspect, there is provided a non-transitory computer-readable recording medium that records a program executable by at least one processor, wherein in accordance with the program, the at least one processor executes: accepting input of an answer to a question and a process until the answer is derived; displaying the answer and the process on a display; and transmitting the answer and the process in association with each other to a server.

According to a third aspect, there is provided a server capable of communicating with a terminal, comprising: a recording medium configured to store a program for providing an educational web service configured to cause at least one processor to execute accepting input of an answer to a question and a process until the answer is derived, displaying the answer and the process on a display, and transmitting the answer and the process in association with each other to a server; and a communication module configured to transmit, to the terminal, the program for providing the educational web service, which is stored in the recording medium.

BRIEF DESCRIPTION OF THE DRAWINGS

FIG. 1 is a block diagram showing an example of the configuration of a system according to an embodiment of the present invention;

FIG. 10 is a view showing the check sticky note in a state in which the equation creation tool is activated;

DETAILED DESCRIPTION

Figure 2:
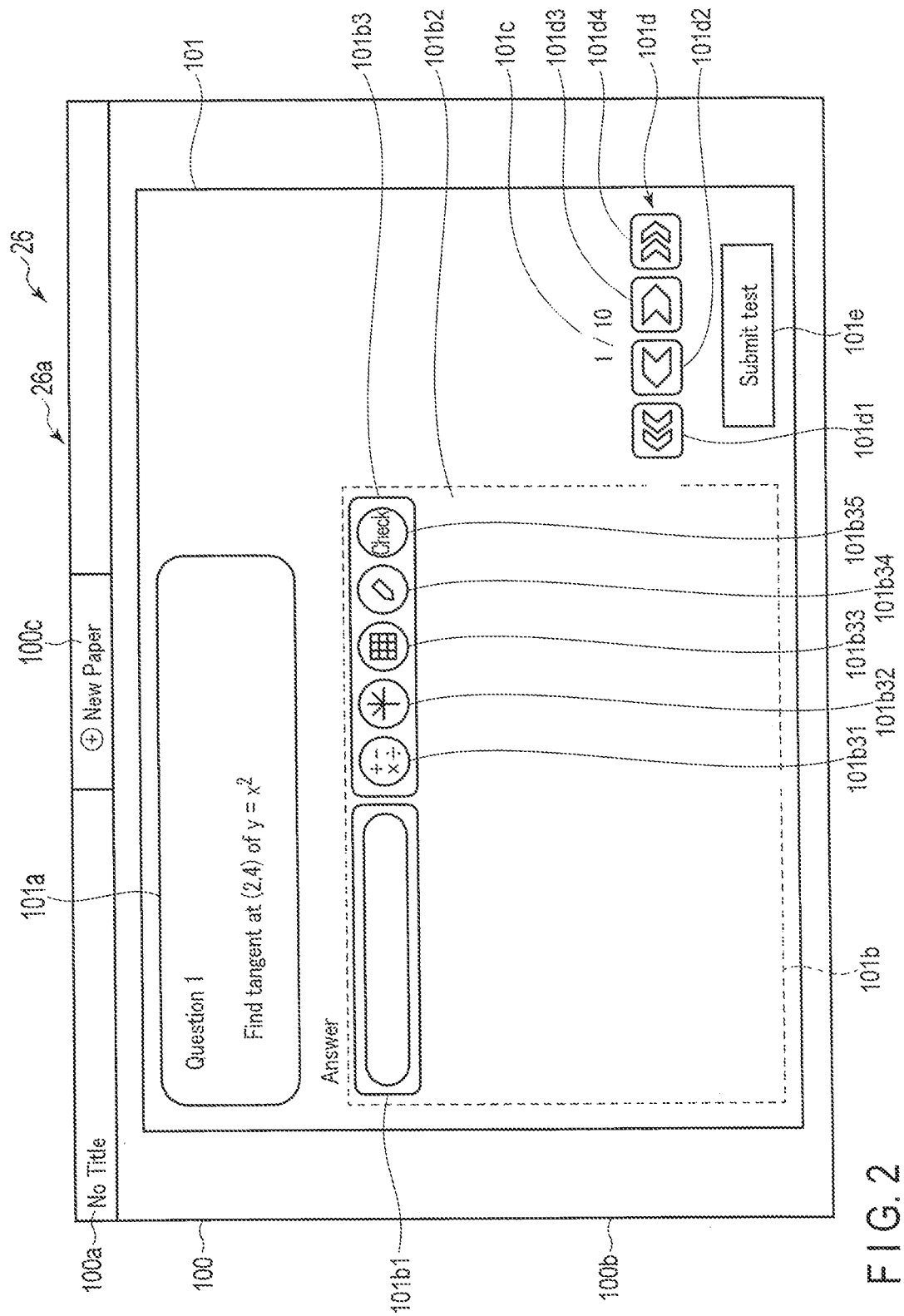
FIG. 2 is a view showing an example of screen display by an application that operates on a web browser in a terminal.

An embodiment of the present invention will be described with reference to the accompanying drawings. FIG. 1 is a block diagram showing an example of the configuration of a system 1 according to an embodiment of the present invention. The system 1 includes a server 10 and a terminal 20. The server 10 and the terminal 20 are communicably connected via a network 30. The network 30 is, for example, the Internet. Note that FIG. 1 shows only one terminal 20, but the number of terminals 20 is not limited to one. That is, there may be two or more terminals 20.

The server 10 includes a processor 11, a ROM 12, a RAM 13, a storage 14, and a communication module 15. These are connected to each other via a system bus 19.

The processor 11 can be an integrated circuit including a CPU (Central Processing Unit), and the like. The ROM 12 records information to be used for the operation of the processor 11 or the like. The RAM 13 is a main storage device for the operation of the processor 11 or the like. The storage 14 stores various kinds of programs such as a server control program used by the processor 11 and an arithmetic program used to execute various kinds of arithmetic operations, parameters, and the like. The processor 11 controls the operation of the server 10 in accordance with the program stored in the storage 14. As the processor 11, a processor other than a CPU, for example, an ASIC (Application Specific Integrated Circuit), an FPGA (Field Programmable Gate Array), a GPU (Graphic Processing unit), or the like may be used. The communication module 15 includes a circuit configured to communicate with an external communication network such as the network 30.

The terminal 20 includes a CPU 21, a ROM 22, a RAM 23, a storage 24, an input device 25, a display 26, and a communication module 27. These are connected to each other via a system bus 29. The terminal 20 may be an electronic device such as a personal computer (PC), a tablet terminal, or a smartphone. In addition, the terminal 20 may be a scientific calculator or the like having a communication function.

The CPU 21 is a processor that controls various kinds of operations of the terminal 20. The ROM 22 records an activation program for the terminal 20, and the like. The RAM 23 is a main storage device for the CPU 21 and the like. The storage 24 stores various kinds of programs such as a terminal control program used by the CPU 21, parameters, and the like. The CPU 21 controls the operation of the terminal 20 by executing various kinds of programs in accordance with an input signal from the input device 25 or a signal received by the communication module 27. The various kinds of programs may be downloaded from a web server (not shown) to the storage 24 via the network 30 and the communication module 27. The communication module 27 includes a circuit configured to communicate with an external communication network such as the network 30.

The input device 25 includes a keyboard, a mouse, a touch panel, and the like. In accordance with a user operation via the input device 25, a signal representing the contents of the user operation is input to the CPU 21 via the system bus 29.

The display 26 is a liquid crystal display, an organic EL display, or the like. The display 26 may be provided integrally with the terminal 20 or may be provided separately from the terminal 20. Various kinds of images are displayed on the display 26.

In an example, the user designates the address of the server 10 on a web browser that operates on the terminal 20. At this time, a display screen for a web application stored in the server 10 is displayed on the web browser in the terminal 20. A request to the server 10 is issued in accordance with an operation performed on the display screen via the input device 25. This operation includes, for example, an operation concerning test conducting on the display screen. The server 10 executes processing according to the request and returns the processing result as a response to the terminal 20. The terminal 20, for example, displays an equation according to a user operation in accordance with the response from the server 10. As described above, in the system 1, a function as a web application for a test is implemented by the program that operates on the web browser in the terminal 20 and the arithmetic program of the server 10.

Such a web application can be used in a math class or the like in a scene of school education in which, for example, the ICT (Information and Communication Technology) progresses.

FIG. 2 is a view showing an example of screen display by an application that operates on a web browser in the terminal 20.

A screen 26a displayed on the display 26 of the terminal 20 includes an upper area 100a and a lower area 100b. The upper area 100a is displayed on the upper side of the screen 26a. The upper area 100a is a long slender area as compared to the lower area 100b. A new paper creation icon 100c is displayed in the upper area 100a. The lower area 100b is an area arranged on the lower side of the upper area 100a in the screen 26a. The lower area 100b is also called a paper 100 in the following description. Various "sticky notes" can be displayed on the paper 100. A sticky note is a display area used to display various kinds of information concerning the web application. A sticky note may be a floating object. The floating object is an object (display body) displayed on the screen, and is an object capable of changing at least the display position in accordance with a user operation.

As an example, a test sticky note 101 is displayed on the paper 100 shown in FIG. 2. Objects other than the test sticky note 101 may be drawn on the paper 100. For example, an equation, a graph, a table, or the like may be drawn on the paper 100. Note that when the test sticky note 101 is drawn on the paper 100, drawing of objects other than sticky notes associated with a test may be inhibited. Sticky notes associated with a test other than the test sticky note 101 include, for example, a check sticky note. The check sticky note will be described later.

The test sticky note 101 is a sticky note including various kinds of display areas concerning a test of mathematics or the like. The test sticky note 101 can be implemented by, for example, adding an API (Application Program Interface) including a test program to the web application.

The test sticky note 101 includes a question display area 101a and an answer input area 101b. The question display area 101a is an area used to display a test question. The answer input area 101b is an area used by the user to input an answer to the question. The answer input area 101b is provided with an answer input field 101b1 and a process input field 101b2. The answer input field 101b1 is an input field to input an answer. The user can input a character, an equation, or the like to the answer input field 101b1 by selecting the answer input field 101b1 by a mouse cursor or the like. The answer input to the answer input field 101b1 is transmitted to the server 10 in accordance with a user operation later. The process input field 101b2 is an input field to input a process until the answer input to the answer input field 101b1 is derived. The user can input a character, an equation, or the like to the process input field 101b2 by selecting the process input field 101b2 by a mouse cursor or the like. As will be described later, the process input field 101b2 is divided into input fields of a plurality of rows. One equation or the like can be input to the input field of each row.

Also, a tool icon 101b3 may further be displayed in the answer input area 101b. The tool icon 101b3 includes, for example, an equation icon 101b31, a graph icon 101b32, a table icon 101b33, a handwriting icon 101b34, and a check icon 101b35. The tool icon 101b3 may include icons different from the icons shown in FIG. 2.

The equation icon 101b31 is an icon configured to accept an operation of activating an equation creation tool in the answer input area 101b. The graph icon 101b32 is an icon configured to accept an operation of activating a graph creation tool in the answer input area 101b. The table icon 101b33 is an icon configured to accept an operation of activating a table creation tool in the answer input area 101b. The handwriting icon 101b34 is an icon configured to accept an operation of activating a handwriting tool. The check icon 101b35 is an icon configured to accept an operation of switching the test sticky note 101 to the check sticky note.

Also, a question count identification index 101c, a question change button 101d, and an answer submit button 101e may further be displayed on the test sticky note 101. The question count identification index 101c is an index indicating the number of the test question currently displayed in the question display area 101a and the total number of test questions. The question change button 101d is a button that accepts an operation of changing the test question displayed in the question display area 101a. The question change button 101d includes a fast rewind button 101d1, a rewind button 101d2, a forward button 101d3, and a fast forward button 101d4. The fast rewind button 101d1 is a button that accepts an operation of, for example, returning the test question displayed in the question display area 101a to the first question. The rewind button 101d2 is a button that accepts an operation of, for example, returning the test question displayed in the question display area 101a to the immediately preceding question. The forward button 101d3 is a button that accepts an operation of, for example, advancing the test question displayed in the question display area 101a to the immediately succeeding question. The fast forward button 101d4 is a button that accepts an operation of, for example, advancing the test question displayed in the question display area 101a to the final question. The answer submit button 101e is a button that accepts an operation of sending, to the server 10, the answer input to the answer input field 101b1. As will be described later, in the embodiment, when the answer submit button 101e is selected, the process input to the process input field 101b2 is sent to the server 10 together with the answer input to the answer input field 101b1.

In this embodiment, the system 1 can start from the white paper 100 and create various kinds of sticky notes. The procedure of a series of processes in the system 1 will be described below.

Figure 3:
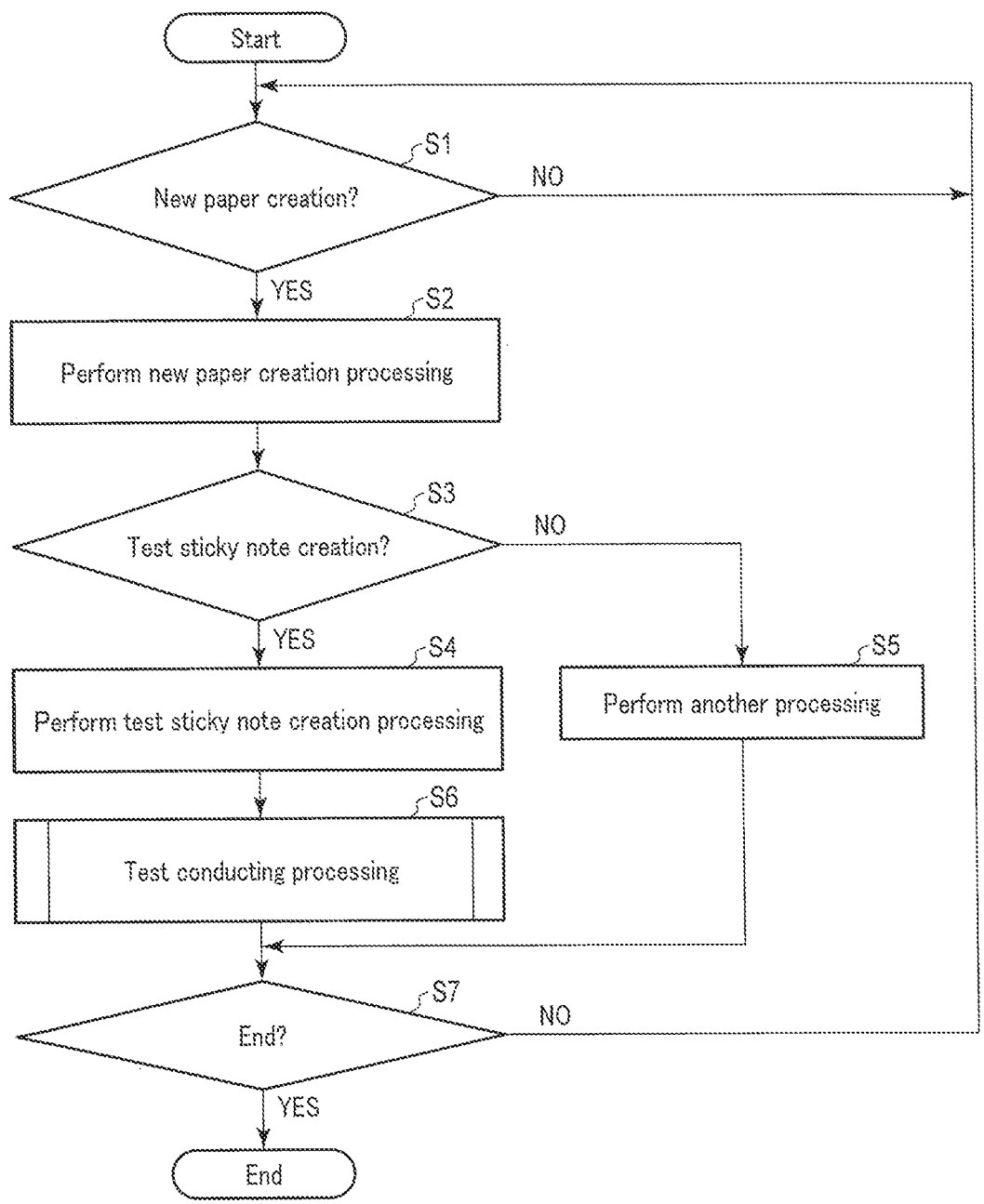
FIG. 3 is a flowchart showing an example of the procedure of processing at the time of execution of a web application in the system.

FIG. 3 is a flowchart showing an example of the procedure of processing at the time of execution of the web application in the system 1. The processing shown in FIG. 3 is executed after a web application activation request is sent from the terminal 20 to the server 10. Note that when requesting activation of the web application, login processing of inputting an ID and a password may be performed. Upon receiving the web application activation request, the server 10 sends the program of the web application including the data of an initial screen to the terminal 20. Upon receiving this, the terminal 20 displays the initial screen on the web browser. The initial screen is a screen in which the paper 100 is not created, and only the new paper creation icon 100c is displayed in the upper area 100a. Note that the processing shown in FIG. 3 is executed by cooperation of the CPU 21 of the terminal 20 and the processor 11 of the server 10.

In step S1, the CPU 21 of the terminal 20 determines whether to create a new paper. For example, when the user selects the new paper creation icon 100c on the initial screen, the CPU 21 of the terminal 20 determines to create a new paper. If it is not determined in step S1 to create a new paper, the process advances to step S7. If it is determined in step S1 to create a new paper, the process advances to step S2.

In step S2, the CPU 21 newly creates the data of the paper 100. The CPU 21 superimposes the created paper 100 on the display screen of the web application and displays it on the web browser. The display on the web browser of the terminal 20 is thus updated to a state in which the newly created paper 100 is displayed. After that, the process advances to step S3. Here, coordinate axes (not shown) are set on the paper 100. Hence, each object arranged on the paper 100 has coordinate information. The CPU 21 acquires the coordinate information of each object as needed.

In step S3, the CPU 21 determines whether to create the test sticky note 101. For example, when a test question is sent from the server 10, the CPU 21 determines to create the test sticky note 101. If it is not determined in step S3 to create the test sticky note 101, the process advances to step S5. If it is determined in step S3 to create the test sticky note 101, the process advances to step S4.

In step S4, the CPU 21 performs test sticky note creation processing. For example, the CPU 21 displays the test sticky note 101 on the web browser while superimposing it at a predetermined position of the paper 100 displayed on the display screen of the web application. The display on the web browser of the terminal 20 is thus updated to a state in which the test sticky note 101 is displayed in the paper 100. After that, the process advances to step S7. Here, in the stage of test sticky note creation processing, no test question is displayed in the question display area 101a. An answer from the user is not accepted either. As described above, the test sticky note 101 may be a floating object. At this time, when an operation of moving the test sticky note 101, for example, a drag operation (an operation of moving the cursor while keeping the mouse click on or an operation of moving the touch position while keeping a touch on the screen of the touch panel) is performed, the CPU 21 may change the display position of the test sticky note 101. After the test sticky note creation processing, the CPU 21 changes the operation mode to a test mode. Here, in FIG. 3, the determination of step S3 is performed after the new paper 100 is created. However, even if the new paper 100 is not created, the test sticky note creation processing may be performed when a test question is sent from the server 10. In this case, the new paper 100 is created independently of the operation of the user.

In step S5, the CPU 21 performs other processes other than the test sticky note creation processing. The other processes include processing such as equation sticky note creation processing and graph sticky note creation processing. A description of details of these other processes will be omitted. After the end of the other processes, the process advances to step S7.

In step S6, the CPU 21 performs test conducting processing. After the test conducting processing, the process advances to step S7. The test conducting processing is processing for conducting a test online. Details of the test conducting processing will be described later.

In step S7, the CPU 21 determines whether to end the processing of the web application. For example, if an operation of closing the web browser is performed, the CPU 21 determines to end the processing. If it is not determined in step S7 to end the processing of the web application, the process returns to step S1. If it is determined in step S7 to end the processing of the web application, the CPU 21 ends the processing shown in FIG. 3.

Figure 4A:
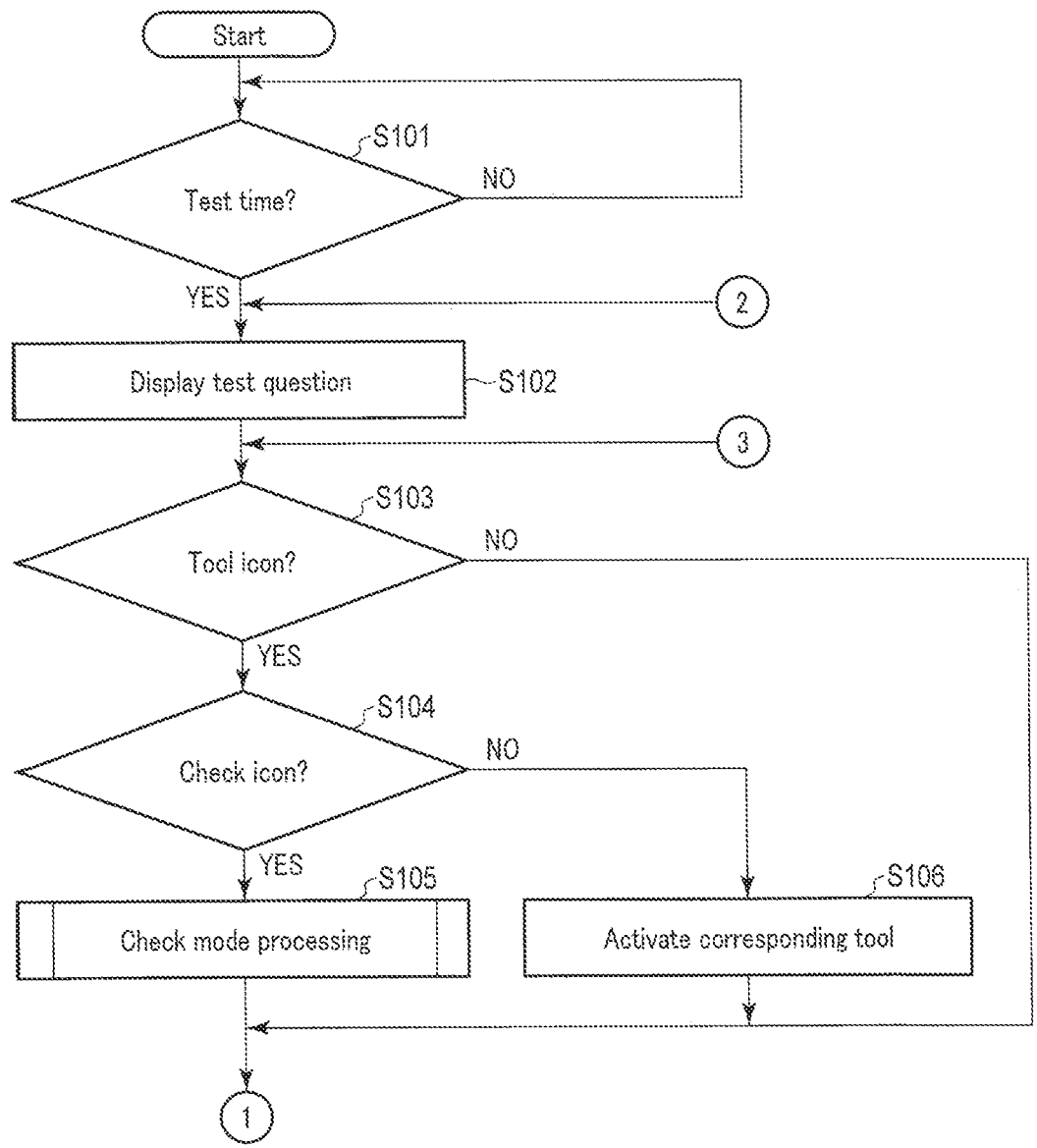
FIG. 4A is a flowchart showing test conducting processing.
Figure 4B:
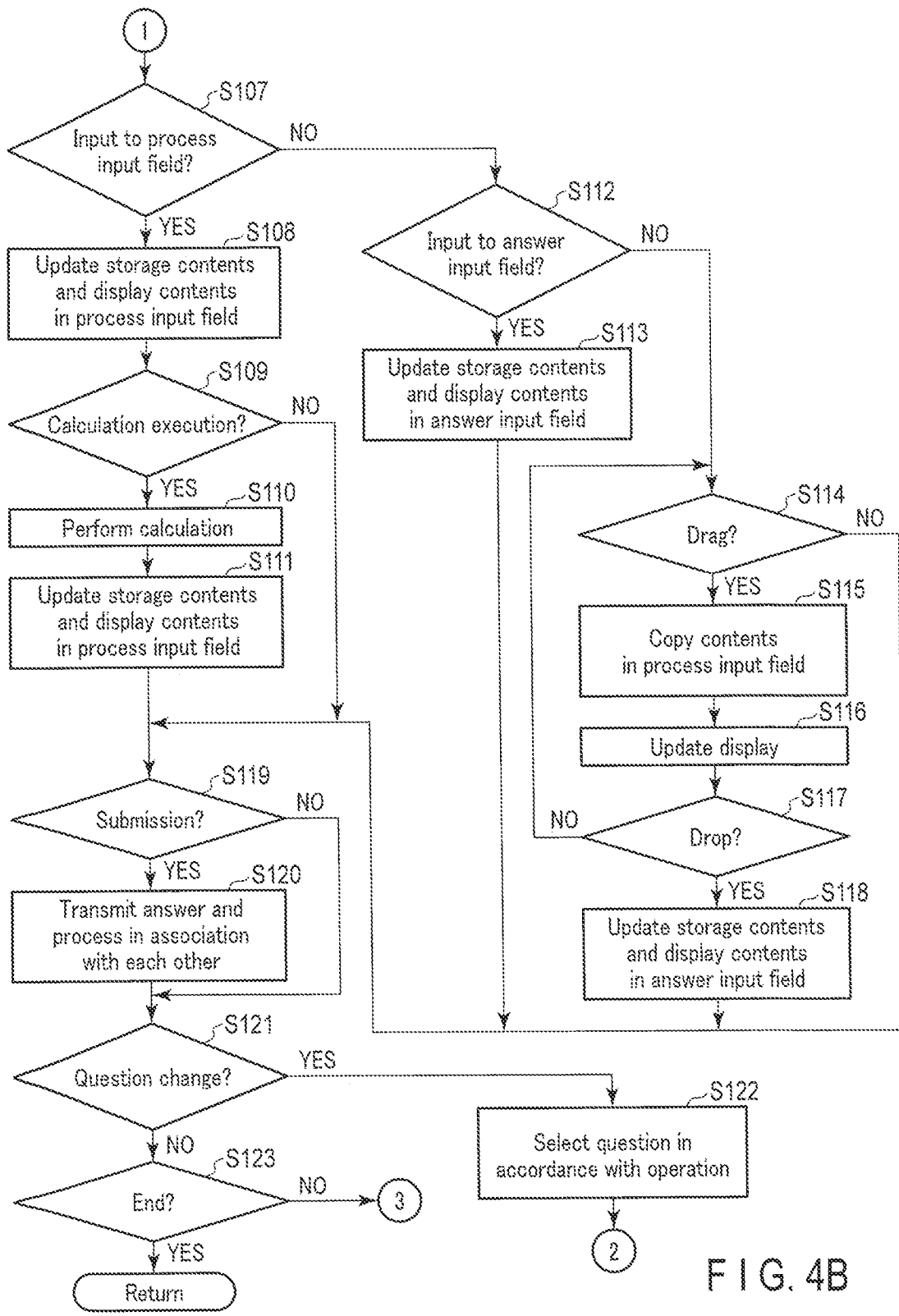
FIG. 4B is a flowchart showing test conducting processing.

FIGS. 4A and 4B are flowcharts showing test conducting processing. In step S101, the CPU 21 determines whether a test time has come. When a test question is sent from the server 10, the test time is also notified by the server 10. In step S101, the CPU 21 waits until the test time comes. If it is determined in step S101 that the test time has come, the process advances to step S102.

Figure 5:
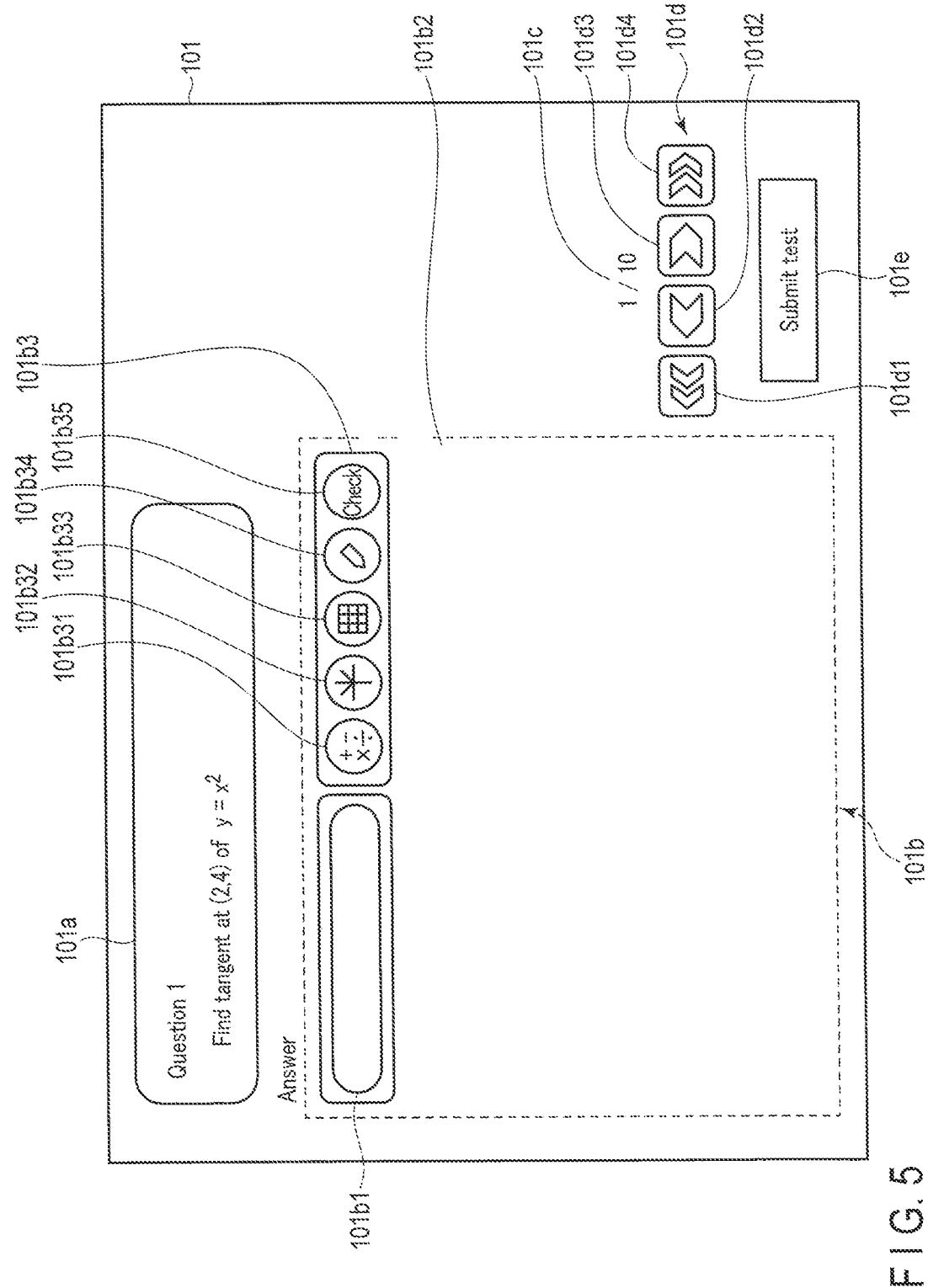
FIG. 5 is a view showing a test sticky note on which question 1 is displayed.

In step S102, the CPU 21 displays a test question in the question display area 101a of the test sticky note 101. In the processing of first step S102, the CPU 21 displays question 1 that is the first question of the test question. FIG. 5 is a view showing the test sticky note 101 on which question 1 is displayed.

In step S103, the CPU 21 determines whether an icon of the tool icon 101b3 is selected. If it is determined in step S103 that the tool icon 101b3 is selected, the process advances to step S104. If it is not determined that the tool icon 101b3 is selected, the process advances to step S107.

In step S104, the CPU 21 determines whether the selected tool icon 101b3 is the check icon 101b35. If it is determined in step S104 that the selected tool icon 101b3 is the check icon 101b35, the process advances to step S105. If it is not determined in step S104 that the selected tool icon 101b3 is the check icon 101b35, the process advances to step S106.

In step S105, the CPU 21 performs check mode processing. After the check mode processing, the process advances to step S107. The check mode is a mode to check the answer of the test question. The check mode processing will be described later.

In step S106, the CPU 21 activates a tool corresponding to the selected icon. For example, if the equation icon 101*b*31 is selected, the CPU 21 activates the equation creation tool.

Figure 6:
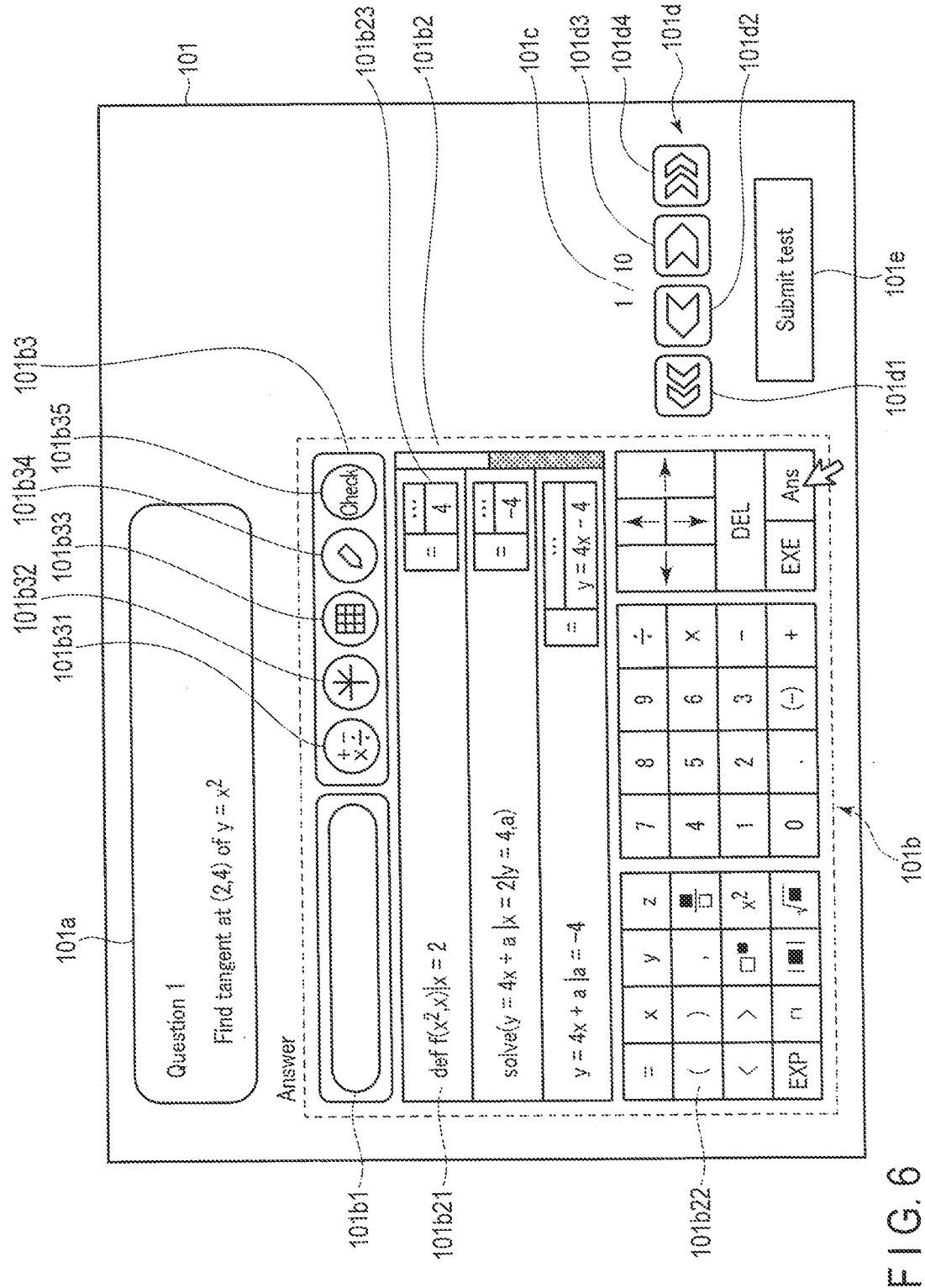
FIG. 6 is a view showing a test sticky note in a state in which an equation creation tool is activated.

FIG. 6 shows the test sticky note 101 in a state in which the equation creation tool is activated. As shown in FIG. 6, an equation creation tool 101*b*22 is activated in the lower region of the process input field 101*b*2. As shown in FIG. 6, the equation creation tool 101*b*22 includes operator keys, numeric keys, cursor keys, a deletion (DEL) key, an execution (EXE) key, and an answer (Ans) key. The operator keys are keys used to input various kinds of operators. The numeric keys are keys used to input numerical values. The cursor keys are keys used to move a cursor indicating, on the screen, the input position of a numerical value or the like. The deletion key is a key used to delete an input numerical value or the like. The execution key is a key used to execute calculation of an input equation. The answer key is a key used to refer an immediately preceding calculation result in another calculation.

Also, if the graph icon 101*b*32 is selected in step S106, the CPU 21 activates the graph creation tool. If the table icon 101*b*33 is selected, the CPU 21 activates the table creation tool. If the handwriting icon 101*b*34 is selected, the CPU 21 activates the handwriting tool.

After these tools are activated, the user can execute creation of equations, graphs, and tables using these tools.

In step S107, the CPU 21 determines whether input to the process input field 101*b*2 is performed. If it is determined in step S107 that input to the process input field 101*b*2 is performed, the process advances to step S108. If it is not determined in step S107 that input to the process input field 101*b*2 is performed, the process advances to step S112.

In step S108, based on the input contents, the CPU 21 updates the contents of the calculation process stored in, for example, the RAM 23. In addition, based on the input contents, the CPU 21 updates the display contents in the process input field 101*b*2. Here, equations and the like input to the process input field 101*b*2 are sequentially stored row by row in a storage area configured to store a calculation process and provided in the RAM 23 for each test question. The row to be stored in the RAM 23 is changed every time the user performs a calculation execution operation, or every time the cursor is changed to another row by the cursor keys. In addition, the equations and the like input to the process input field 101*b*2 can be displayed row by row in the process input field 101*b*2, as indicated by reference numeral 101*b*21 in FIG. 6. Here, if the equations and the like cannot wholly be displayed in the process input field 101*b*2, scroll display or the like may be used.

In step S109, the CPU 21 determines whether to execute calculation. For example, when the execution key is selected, it is determined to execute calculation. If it is determined in step S109 to execute calculation, the process advances to step S110. If it is not determined in step S109 to execute calculation, the process advances to step S111.

In step S110, the CPU 21 executes calculation for the equation of the row designated for calculation execution. For example, if the execution key is selected after the input of the equation of the first row in the process input field 101*b*2 shown in FIG. 6, the CPU 21 executes calculation to obtain a differential coefficient for x=2 in the function $y=x^2$. Here, the calculation need not always be performed in the terminal 20. The calculation may be performed in the server 10. In this case, the CPU 21 transmits information necessary for the calculation to the server 10.

In step S111, the CPU 21 updates the storage contents and the display contents in the process input field 101*b*2 based on the calculation result. After that, the process advances to step S119. For example, the CPU 21 stores the calculation result in the RAM 23. Also, for example, as shown in FIG. 6, the CPU 21 displays the calculation result in a calculation result display field 101*b*23 of the process input field 101*b*2.

In step S112, the CPU 21 determines whether input to the answer input field 101*b*1 is performed. If it is determined in step S112 that input to the answer input field 101*b*1 is performed, the process advances to step S113. If it is not determined in step S112 that input to the answer input field 101*b*1 is performed, the process advances to step S114.

In step S113, based on the input contents, the CPU 21 updates the contents of the answer stored in, for example, the RAM 23. In addition, based on the input contents, the CPU 21 updates the display contents in the answer input field 101*b*1. After that, the process advances to step S119. Here, the answer input to the answer input field 101*b*1 is stored in a storage area configured to store an answer and provided in the RAM 23 for each test question. Also, the answer input to the answer input field 101*b*1 can be displayed, for example, as shown in FIG. 6. Here, if the answer cannot wholly be displayed in the answer input field 101*b*1, scroll display or the like may be used.

In step S114, the CPU 21 determines whether a drag operation is performed. The drag operation according to the embodiment is an operation of moving a selection position in a state in which an equation or the like displayed in the process input field 101*b*2 is selected. The drag operation can be performed by operating the touch panel and a pointing device such as a mouse. If it is determined in step S114 that the drag operation is performed, the process advances to step S115. If it is not determined in step S114 that the drag operation is performed, the process advances to step S119.

In step S115, the CPU 21 copies the equation or the like selected in the process input field 101*b*2 and stores it in, for example, the RAM 23.

In step S116, the CPU 21 updates the display in the process input field 101*b*2 in accordance with the drag operation.

In step S117, the CPU 21 determines whether a drop operation is performed. The drop operation according to the embodiment is an operation of canceling the drag operation at a position in the answer input field 101*b*1. If it is determined in step S117 that the drop operation is performed, the process advances to step S118. If it is not determined in step S117 that the drop operation is performed, the process returns to step S114. That is, the processes of steps S114 to S117 are repeated until the drop operation is performed, or the drag operation is canceled before the drop operation is performed.

Figure 7:
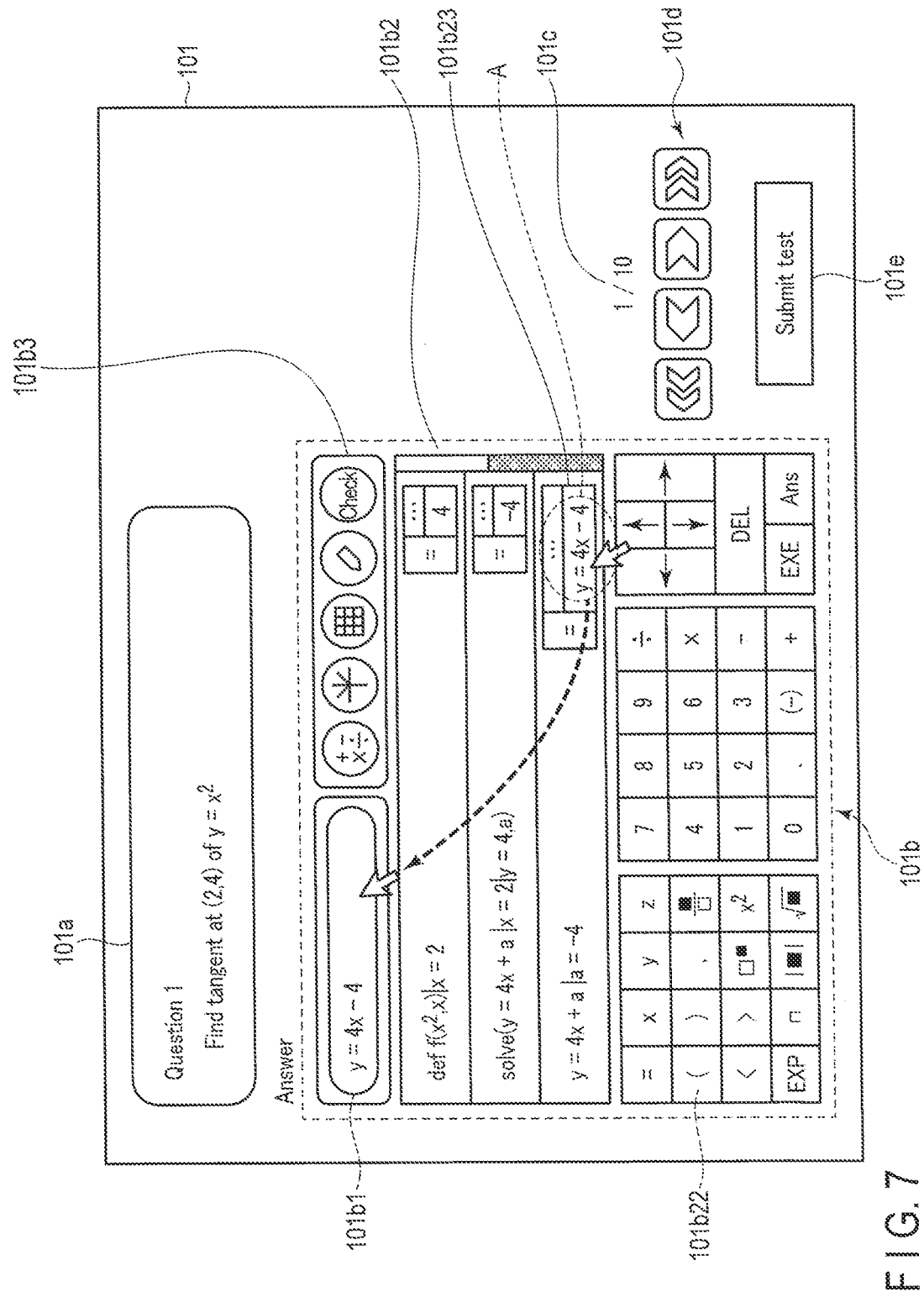
FIG. 7 is a view showing input to an answer input field using a drag-and-drop operation.

In step S118, assuming that the equation or the like copied in step S115 is the answer input by the user, the CPU 21 updates the contents of the answer stored in, for example, the RAM 23. In addition, the CPU 21 updates the display contents in the answer input field 101*b*1. After that, the process advances to step S119. Here, as in the case in which the answer is directly input by the user, the answer input to the answer input field 101*b*1 is stored in a storage area configured to store an answer and provided in the RAM 23 for each test question. Also, the answer input to the answer input field 101*b*1 using the drag-and-drop operation as a first operation can be displayed, for example, as shown in FIG. 7. FIG. 7 shows an example in which an equation y=4x−4 indicated by A in the calculation result display field 101*b*23 is copied to the answer input field 101*b*1. Here, if the answer cannot wholly be displayed in the answer input field 101*b*1, scroll display or the like may be used.

In step S119, the CPU 21 determines whether the answer submit button 101*e* is selected as a second operation. If it is determined in step S119 that the answer submit button 101*e* is selected, the process advances to step S120. If it is not determined in step S119 that the answer submit button 101*e* is selected, the process advances to step S121.

In step S120, the CPU 21 transmits, to the server 10, the answer stored in the RAM 23 and the process to derive the answer in association with each other. After that, the process advances to step S121. In step S120, the CPU 21 may transmit only an answer and process corresponding to the question displayed in the question display area 101*a*, or may transmit answers and processes corresponding to all questions to the server 10. When the answer is transmitted to the server 10, the answer of the user is scored. The scoring may be executed by the server 10 in accordance with a predetermined criterion. Alternatively, the scoring may be executed by a teacher or the like by accessing the server 10. In the embodiment, the answer and the process are associated and transmitted to the server 10. Hence, the teacher or the like can execute scoring in consideration of not only the answer but also the process.

In step S121, the CPU 21 determines whether to change the question. If a button included in the question change button 101*d* is selected, it is determined to change the question. If it is determined in step S121 to change the question, the process advances to step S122. If it is not determined in step S121 to change the question, the process advances to step S123.

In step S122, the CPU 21 changes the question in accordance with the button selected in the question change button 101*d*. In addition, the CPU 21 changes the numerical value of the question count identification index 101*c* in accordance with the changed question. After that, the process returns to step S101. For example, if the forward button 101*d*3 is selected, the CPU 21 changes the question under selection to the next question.

In step S123, the CPU 21 determines whether to end the test. For example, if the test time ends, it is determined to end the test. Alternatively, if the user performs an operation of ending the test, it may be determined to end the test. If it is not determined in step S123 to end the test, the process returns to step S103. If it is determined in step S123 to end the test, the CPU 21 ends the processing shown in FIGS. 4A and 4B.

Figure 8:
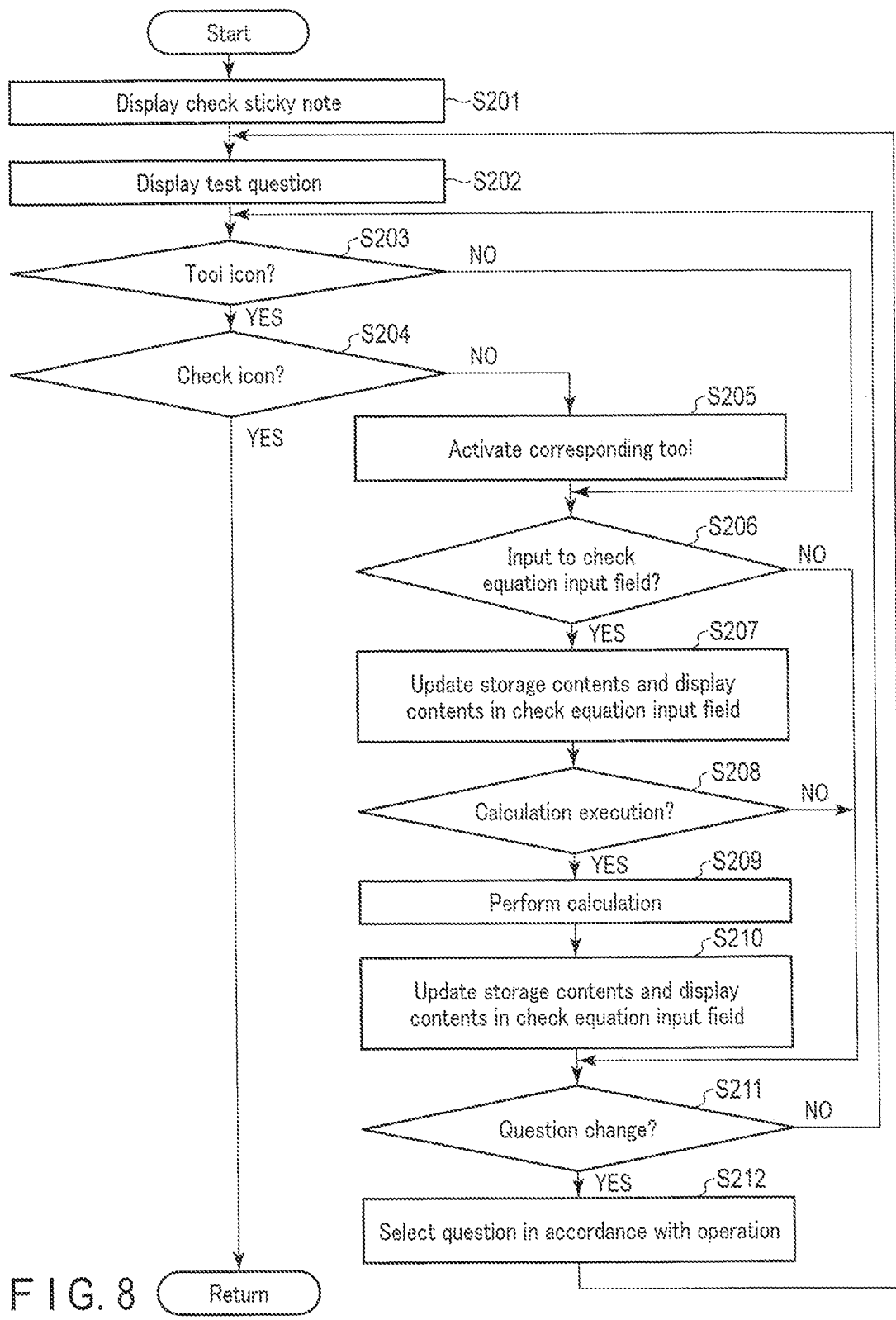
FIG. 8 is a flowchart showing check mode processing.
Figure 9:
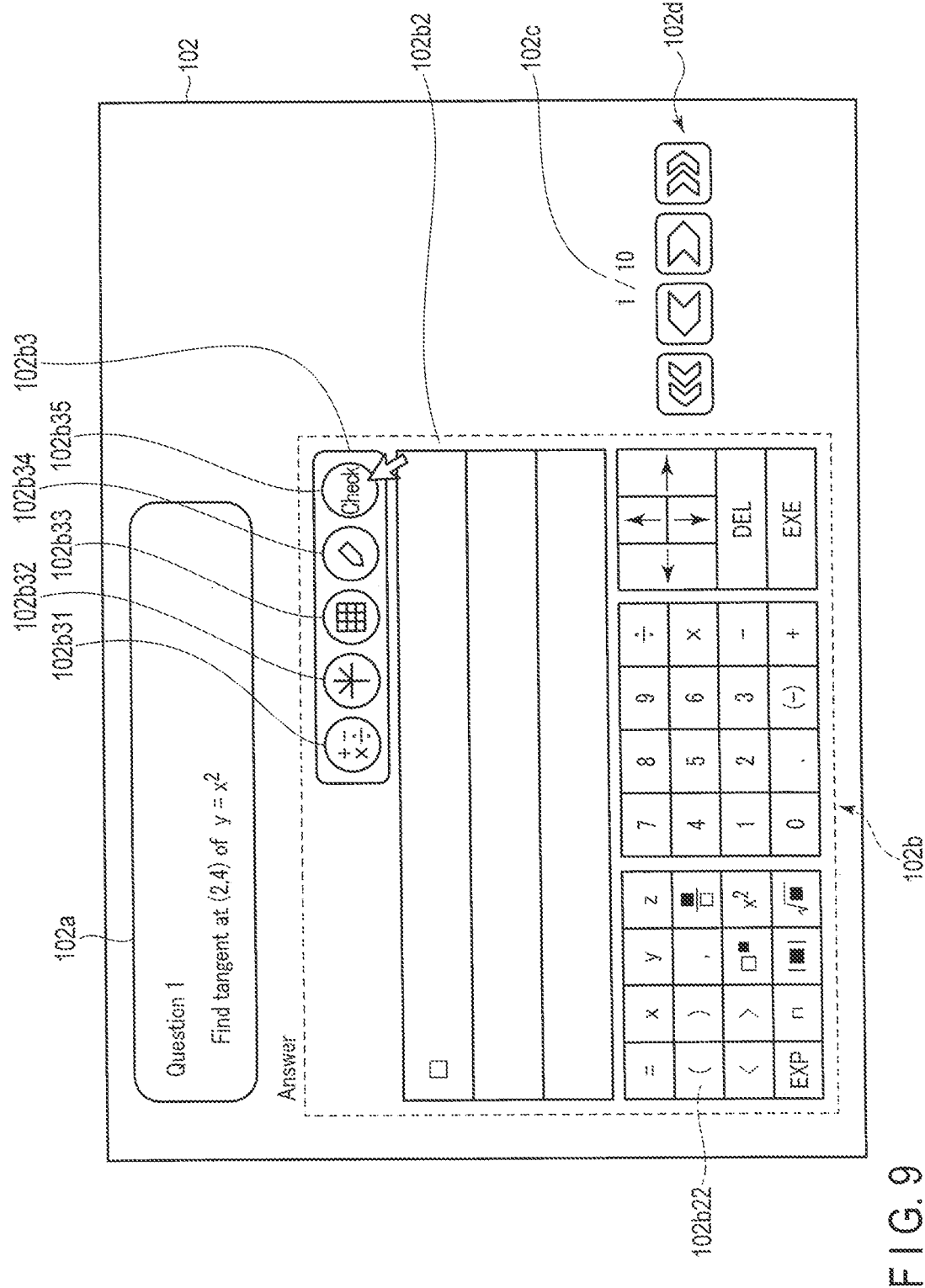
FIG. 9 is a view showing an example of a check sticky note.

Check mode processing will be described next. FIG. 8 is a flowchart showing check mode processing. In step S201, in place of the test sticky note 101, the CPU 21 displays a check sticky note on the web browser while superimposing it at a predetermined position of the paper 100 displayed on the display screen of the web application. FIG. 9 is a view showing an example of the check sticky note. A check sticky note 102 includes a question display area 102*a*, like the test sticky note 101. On the other hand, the check sticky note 102 includes a check equation input area 102*b* in place of the answer input area 101*b*. The check equation input area 102*b* does not include an answer input field and includes only a check equation input field 102*b*2 corresponding to the process input field 101*b*2 and a tool icon 102*b*3 corresponding to the tool icon 101*b*3. The tool icon 102*b*3 includes, for example, an equation icon 102*b*31, a graph icon 102*b*32, a table icon 102*b*33, a handwriting icon 102*b*34, and a check icon 102*b*35, like the tool icon 101*b*3. The tool icon 102*b*3 may include icons different from the icons shown in FIG. 9. These icons are icons configured to accept the same operations as the corresponding icons of the tool icon 101*b*3.

Also, a question count identification index 102*c* and a question change button 102*d* similar to those of the test sticky note 101 may further be displayed on the check sticky note 102. On the other hand, a button corresponding to the answer submit button 101*e* need not be displayed, unlike the test sticky note 101. That is, in the check mode processing, contents input to the check equation input field 102*b*2 cannot be transmitted to the server 10.

In step S202, the CPU 21 displays a test question in the question display area 102*a* of the check sticky note 102. The displayed test question is the same as, for example, the test question displayed on the immediately preceding test sticky note 101.

In step S203, the CPU 21 determines whether an icon of the tool icon 102*b*3 is selected. If it is determined in step S203 that the tool icon 102*b*3 is selected, the process advances to step S204. If it is not determined that the tool icon 102*b*3 is selected, the process advances to step S205.

In step S204, the CPU 21 determines whether the selected tool icon 102*b*3 is the check icon 102*b*35. If it is determined in step S204 that the selected tool icon 102*b*3 is the check icon 102*b*35, the CPU 21 ends the processing shown in FIG. 8. That is, if the check icon 102*b*35 is selected again during the check mode processing, the CPU 21 ends the check mode processing. If it is not determined in step S204 that the selected tool icon 102*b*3 is the check icon 102*b*35, the process advances to step S205.

In step S205, the CPU 21 activates a tool corresponding to the selected icon. For example, if the equation icon 102*b*31 is selected, the CPU 21 activates the equation creation tool.

FIG. 10 shows the check sticky note 102 in a state in which the equation creation tool is activated. As shown in FIG. 10, an equation creation tool 102*b*22 is activated in the lower region of the check equation input field 102*b*2. As shown in FIG. 10, the equation creation tool 102*b*22 includes operator keys, numeric keys, cursor keys, a deletion (DEL) key, and an execution (EXE) key. The operator keys, the numeric keys, the cursor keys, the deletion key, and the execution key in the equation creation tool 102*b*22 may be the same as the operator keys, the numeric keys, the cursor keys, the deletion key, and the execution key in the equation creation tool 101*b*22. In addition, the equation creation tool 102*b*22 need not include an answer (Ans) key but may include an answer key.

Also, if the graph icon 102*b*32 is selected in step S205, the CPU 21 activates the graph creation tool. If the table icon 102*b*33 is selected, the CPU 21 activates the table creation tool. If the handwriting icon 102*b*34 is selected, the CPU 21 activates the handwriting tool.

After these tools are activated, the user can execute creation of equations, graphs, and tables using these tools. That is, even in the check equation input field 102*b*2, the user can perform the same input as in the process input field 101*b*2.

In step S206, the CPU 21 determines whether input to the check equation input field 102*b*2 is performed. If it is determined in step S206 that input to the check equation input field 102*b*2 is performed, the process advances to step S207. If it is not determined in step S206 that input to the check equation input field 102*b*2 is performed, the process advances to step S211.

In step S207, based on the input contents, the CPU 21 updates the contents of the check equation stored in, for example, the RAM 23. In addition, based on the input contents, the CPU 21 updates the display contents in the check equation input field 102*b*2. Here, equations and the like input to the check equation input field 102*b*2 are sequentially stored row by row in a storage area configured to store a check equation and provided in the RAM 23 for each test question. The storage area configured to store the check equation is a storage area different from the storage area configured to store a calculation process. The row to be stored in the RAM 23 is changed every time the user performs a calculation execution operation, or every time the cursor is changed to another row by the cursor keys. In addition, the equations and the like input to the check equation input field 102*b*2 can be displayed row by row in the check equation input field 102*b*2, as in the process input field 101*b*2. Here, if the check equation cannot wholly be displayed in the check equation input field 102*b*2, scroll display or the like may be used.

In step S208, the CPU 21 determines whether to execute calculation. For example, when the execution key is selected, it is determined to execute calculation. If it is determined in step S208 to execute calculation, the process advances to step S209. If it is not determined in step S208 to execute calculation, the process advances to step S210.

In step S209, the CPU 21 executes calculation for the equation of the row designated for calculation execution. For example, if the execution key is selected after the input of the equation of the first row in the check equation input field 102*b*2 shown in FIG. 10, the CPU 21 calculates the result of substituting a=4 into a check equation y=4a−4. Here, the calculation need not always be performed in the terminal 20. The calculation may be performed in the server 10. In this case, the CPU 21 transmits information necessary for the calculation to the server 10.

In step S210, the CPU 21 updates the storage contents and the display contents in the check equation input field 102*b*2 based on the calculation result. After that, the process advances to step S211. For example, the CPU 21 stores the calculation result in the RAM 23. Also, the CPU 21 displays the calculation result in the check equation input field 102*b*2.

In step S211, the CPU 21 determines whether to change the question. If a button included in the question change button 102*d* is selected, it is determined to change the question. If it is determined in step S211 to change the question, the process advances to step S212. If it is not determined in step S211 to change the question, the process returns to step S203.

In step S212, the CPU 21 changes the question in accordance with the button selected in the question change button 102*d*. After that, the process returns to step S202. For example, if the forward button 102*d*3 is selected, the CPU 21 changes the question under selection to the next question.

As described above, according to this embodiment, in the web service for a test, the answer and the process to reach the answer are sent to the server 10. That is, in the embodiment, the answer input to the answer input field 101*b*1 and the process input to the process input field 101*b*2 are sent to the server 10 in association with each other. Hence, for example, the server 10 can perform scoring in consideration of the process to reach the answer as well. Also, a teacher can also access the server 10 at a necessary timing and perform scoring in consideration of the process to reach the answer. As a result, the scoring accuracy in the web service for a test can be improved.

Also, in the embodiment, the equation input to the process input field 101*b*2 is copied to the answer input field 101*b*1 by the drag-and-drop operation. This reduces the labor of input to the answer input field 101*b*1.

Additionally, the system according to the embodiment has a check mode for checking whether the answer is correct. The check mode is a mode different from the test mode. For this reason, the contents input to the check equation input field 102*b*2 during the check mode do not affect the process input field 101*b*2. Also, the contents input to the check equation input field 102*b*2 are not sent to the server 10. As described above, in the embodiment, a paper sent to the server 10 does not include the check equation unnecessary for scoring.

Modification

A modification of the embodiment will be described below. In the embodiment, the answer input area 101*b* on the test sticky note 101 is divided into the answer input field 101*b*1 and the process input field 101*b*2. However, the answer input area 101*b* need not always be divided into the answer input field 101*b*1 and the process input field 101*b*2.

Figure 11:
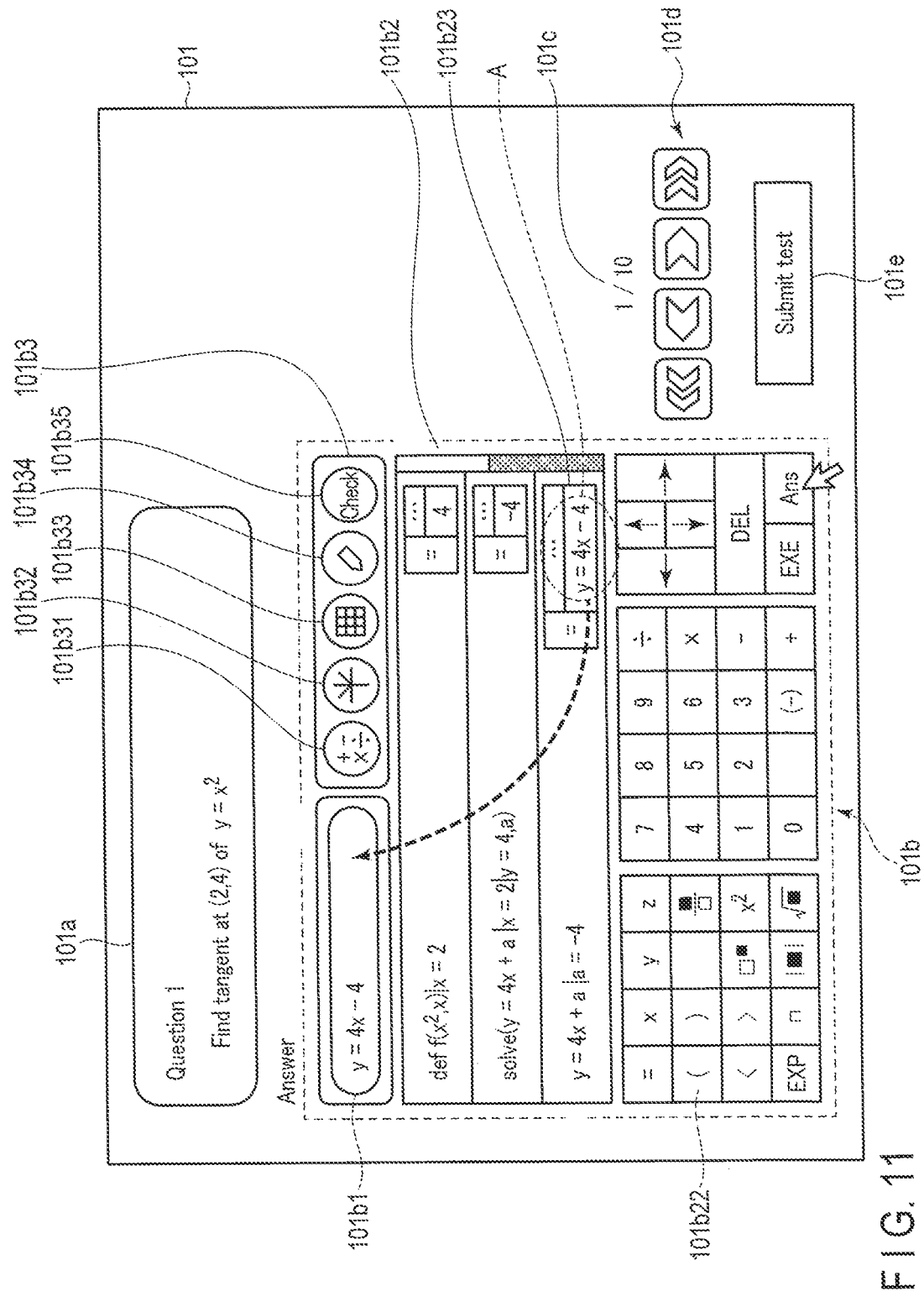
FIG. 11 is a view showing input to the answer input field using an answer key.

Also, in the embodiment, the input from the process input field 101*b*2 to the answer input field 101*b*1 is done by the drag-and-drop operation. However, the input from the process input field 101*b*2 to the answer input field 101*b*1 may be done when, for example, a predetermined key operation is performed. FIG. 11 is a view showing an example in which input to the answer input field 101*b*1 is done when the answer (Ans) key is selected. In FIG. 11, if the answer key is selected, the calculation result that is obtained by calculation when the execution (EXE) key is selected immediately before and indicated by A in the calculation result display field 101*b*23 is input to the answer input field 101*b*1. FIG. 11 shows an example in which the input is executed by selecting the answer key. The input may be executed by selecting another key. In addition, the equation to be input is not limited to the calculation result displayed in the calculation result display field 101*b*23. For example, a numerical value or the like after the equal sign (=), that is, on the right side of an equation displayed in the last row of the process input field 101*b*2 may be input to the answer input field 101*b*1.

Also, the input from the process input field 101*b*2 to the answer input field 101*b*1 may be done by, for example, selecting a predetermined character string such as the equal sign (=) displayed in the process input field 101*b*2. In this case as well, the numerical value or the like after the equal sign (=), that is, on the right side may be input to the answer input field 101*b*1.

Figure 12:
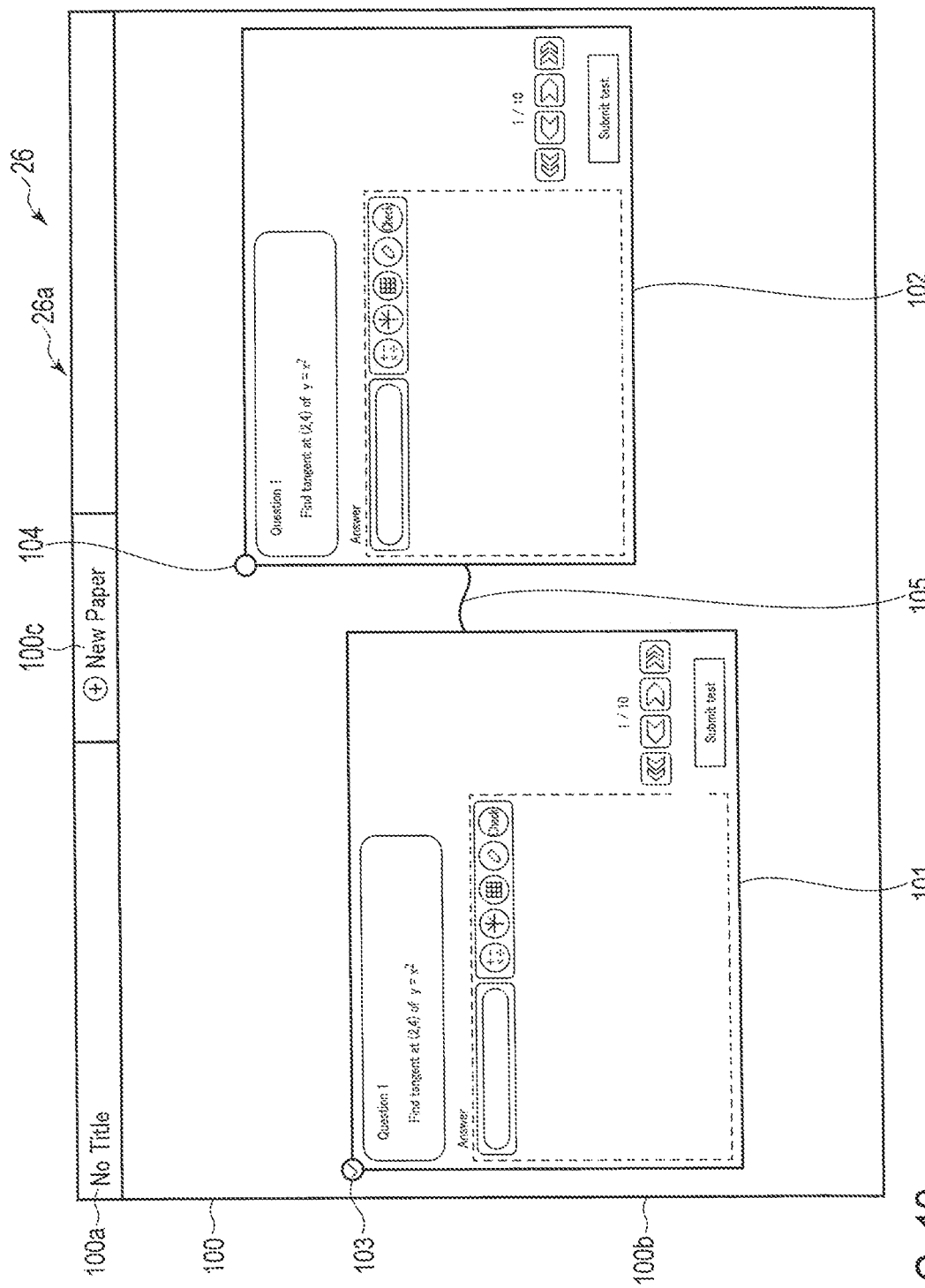
FIG. 12 is a view showing an example in which a test sticky note and a check sticky note are displayed simultaneously on one paper.

Also, in the above-described example, the sticky note displayed on the paper 100 is switched from the test sticky note 101 to the check sticky note 102 along with switching from the test mode to the check mode. However, as shown in FIG. 12, the test sticky note 101 and the check sticky note 102 may simultaneously be displayed on one paper 100. Here, check fields 103 and 104 are displayed at the upper left corners of the test sticky note 101 and the check sticky note 102, respectively. For example, if one of the sticky notes is selected, a check mark is displayed in a corresponding check field. In FIG. 12, the test sticky note 101 is selected. At this time, a check mark is displayed in the check field 103. Instead of displaying the check mark, the selected sticky note and the unselected sticky note may be discriminated by another display. As a visual discrimination method, only the outer frame of the selected sticky note may be displayed thicker than in the remaining sticky note, the line type or color of the outer frame of the selected sticky note may be displayed in a way different from the remaining sticky note, or the outer frame under selection may be blinked.

Additionally, the test sticky note 101 and the check sticky note 102 may be associated as one group. At this time, a string 105 indicating that the test sticky note 101 and the check sticky note 102 are associated may be displayed between the test sticky note 101 and the check sticky note 102. In the case of FIG. 12, contents input to the answer input area 101*b* of the test sticky note 101 may be copied to the check equation input area 102*b* of the check sticky note 102 or, reversely, contents input to the check equation input area 102*b* of the check sticky note 102 may be copied to the answer input area 101*b* of the test sticky note 101. The operation of copy may be the above-described drag-and-drop operation or the operation of a predetermined key.

In the embodiment, as the test question, a test question of mathematics is shown. However, the embodiment can be applied to various kinds of online tests for which scoring is performed in consideration of an answer and a process to reach that. For example, the embodiment can also be applied to a test of physics or chemistry. Furthermore, the embodiment can be applied to various kinds of educational web services that not only conduct tests but also submit homework online or submit answers to workbook questions.

Moreover, in the above-described embodiment, the terminal 20 is configured to execute test conducting processing or the like by downloading the program for the web application from the server 10. However, when the same program as the web application is stored in the storage 24 of the terminal 20, the terminal 20 can independently execute the processing of the web application described in the above-described embodiment. In this case, the terminal 20 need not have the communication function.

Note that the present invention is not limited to the above-described embodiments, and various changes and modifications can be made without departing from the scope of the present invention at the practice stage. The embodiments may be practiced in appropriate combination as much as possible, and in this case, the effect of the combination can be obtained. The embodiments incorporate inventions of various stages, and various inventions can be extracted by appropriately combining a plurality of constituent elements disclosed in the embodiments. For example, even if several constituent elements are deleted from all constituent elements shown in the embodiments, if the problem described in the section of the problem to be solve by the invention can be solved, and the effect described in the section of the effect of the invention can be obtained, a configuration without the constituent elements can be extracted as an invention.

The invention claimed is:

1. An educational web service providing method comprising:
   causing, by a terminal, a display of the terminal to display a first input field corresponding to an answer to a question and a second input field corresponding to a process to derive the answer;
   receiving, by the terminal, process input to the second input field;
   causing, by the terminal, information corresponding to the process input to be displayed in the second input field;
   receiving, by the terminal, an indication of a first operation by a user, wherein the first operation includes a drag-and-drop operation of moving a portion of the second input field corresponding to the answer to the first input field;
   responsive to receiving the indication of the first operation, causing, by the terminal, the portion of the second input field corresponding to the answer to be displayed in the first input field;
   receiving, by the terminal, an indication of a second operation by the user; and
   responsive to receiving the indication of the second operation, transmitting, by the terminal, contents of the first input field and the second input field in association with each other to a server.

2. The educational web service providing method according to claim 1, wherein the first operation is an operation of a predetermined key.

3. The educational web service providing method according to claim 1, further comprising:
   receiving an indication of a third operation by the user;
   responsive to receiving the indication of the third operation:
      causing the display to cease displaying the first input field; and
      causing the display to display a third input field corresponding to a check equation to the answer;
   receiving check equation input to the third input field; and
   causing information corresponding to the check equation input to be displayed in the third input field, wherein contents of the third input field are not transmitted to the server.

4. A non-transitory computer-readable recording medium that records a program executable by at least one processor, wherein in accordance with the program, the at least one processor executes:
   causing a display of a terminal to display a first input field corresponding to an answer to a question and a second input field corresponding to a process to derive the answer;
   receiving process input to the second input field;
   causing information corresponding to the process input to be displayed in the second input field;
   receiving an indication of a first operation by a user, wherein the first operation includes a drag-and-drop operation of moving a portion of the second input field corresponding to the answer to the first input field;
   responsive to receiving the indication of the first operation, causing the portion of the second input field corresponding to the answer to be displayed in the first input field;
   receiving an indication of a second operation by the user; and
   responsive to receiving the indication of the second operation, transmitting contents of the first input field and the second input field in association with each other from the terminal to a server.

5. The non-transitory computer-readable recording medium according to claim 4, wherein the first operation is an operation of a predetermined key.

6. The non-transitory computer-readable recording medium according to claim 4, wherein in accordance with the program, the at least one processor further executes:
   receiving an indication of a third operation by the user;
   responsive to receiving the indication of the third operation:
      causing the display to cease displaying the first input field; and
      causing the display to display a third input field corresponding to a check equation to the answer;
   receiving check equation input to the third input field; and
   causing information corresponding to the check equation input to be displayed in the third input field, wherein contents of the third input field are not transmitted to the server.

7. A server comprising:
a recording medium storing a program for providing an educational web service configured to cause at least one processor of a terminal to:
  cause a display of the terminal to display a first input field corresponding to an answer to a question and a second input field corresponding to a process to derive the answer;
  receive process input to the second input field;
  cause information corresponding to the process input to be displayed in the second input field;
  receive an indication of a first operation by a user, wherein the first operation is a drag-and-drop operation of moving a portion of the second input field corresponding to the answer to the first input field;
  responsive to receiving the indication of the first operation, cause the portion of the second input field corresponding to the answer to be displayed in the first input field;
  receive an indication of a second operation by the user; and
  responsive to receiving the indication of the second operation, transmit contents of the first input field and the second input field in association with each other to the server; and
a communication module configured to:
  transmit, from the server to the terminal, the program for providing the educational web service; and
  receive, from the terminal, the contents of the first input field and the second input field in association with each other.

8. The server according to claim 7, wherein the first operation is an operation of a predetermined key.

9. The server according to claim 7, wherein the educational web service is further configured to cause the at least one processor of the terminal to:
  receive an indication of a third operation by the user;
  responsive to receiving the indication of the third operation:
    cause the display to cease displaying the first input field; and
    cause the display to display a third input field corresponding to a check equation to the answer;
  receive check equation input to the third input field; and
  cause information corresponding to the check equation input to be displayed in the third input field, wherein contents of the third input field are not transmitted to the server.

* * * * *